(12) United States Patent
Osada et al.

(10) Patent No.: US 9,359,539 B2
(45) Date of Patent: Jun. 7, 2016

(54) VEHICLE LAMP

(71) Applicant: KOITO MANUFACTURING CO., LTD., Tokyo (JP)

(72) Inventors: Kazuhito Osada, Shizuoka (JP); Fukashi Masuda, Shizuoka (JP); Takenao Yoshimura, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 122 days.

(21) Appl. No.: 14/378,242

(22) PCT Filed: Feb. 4, 2013

(86) PCT No.: PCT/JP2013/052499
§ 371 (c)(1),
(2) Date: Aug. 12, 2014

(87) PCT Pub. No.: WO2013/121915
PCT Pub. Date: Aug. 22, 2013

(65) Prior Publication Data
US 2015/0036376 A1 Feb. 5, 2015

(30) Foreign Application Priority Data

Feb. 13, 2012 (JP) .................. 2012-028349

(51) Int. Cl.
*C09J 175/04* (2006.01)
*F21S 8/10* (2006.01)

(52) U.S. Cl.
CPC ............ *C09J 175/04* (2013.01); *F21S 48/1208* (2013.01); *F21S 48/155* (2013.01); *F21S 48/31* (2013.01); *F21S 48/33* (2013.01); *C09J 2201/614* (2013.01)

(58) Field of Classification Search
CPC .. C09J 175/04; C09J 2201/614; C09J 175/00; B60Q 1/04; F21S 48/31; F21S 48/33; F21S 48/1208; F21S 48/155; F21S 48/10; F21S 48/12; F21S 48/15; F21S 48/25
See application file for complete search history.

(56) References Cited

U.S. PATENT DOCUMENTS 4,891,269 A * 1/1990 Markevka ............... C08G 18/10
156/307.3
5,441,808 A * 8/1995 Anderson ............... C08G 18/10
428/349

(Continued)

FOREIGN PATENT DOCUMENTS

JP 01-242234 A 9/1989
JP 2010-247860 A 11/2010

(Continued)

OTHER PUBLICATIONS

International Search Report for PCT/JP2013/052499 dated Apr. 23, 2013 [PCT/ISA/210].
Written Opinion for PCT/JP2013/052499 dated Apr. 23, 2013 [PCT/ISA/237].
Notification of Transmittal of International Search Report and Written Opinion for PCT/JP2013/052499 dated Apr. 23, 2013 [PCT/ISA/220].

*Primary Examiner* — Bao Q Truong
(74) *Attorney, Agent, or Firm* — Sughrue Mion, PLLC

(57) ABSTRACT

Provided is a vehicle lamp 1 using a lamp body 3 formed using a resin composition containing a base resin and plant fiber, in which the lamp body 3 and a front cover 2 have good adhesiveness therebetween and there is no separation in the bonding between the lamp body 3 and the front cover 2 even after some time. The lamp body 3 is formed using a resin composition containing a base resin and plant fiber, and in a bonding part between the lamp body 3 and the front cover 2, the bonding is performed using a moisture curing adhesive.

8 Claims, 1 Drawing Sheet

(56) References Cited

U.S. PATENT DOCUMENTS

| | | | | |
|---|---|---|---|---|
| 5,611,612 | A | * | 3/1997 | Choji ..................... B60Q 1/007 362/267 |
| 6,270,615 | B1 | * | 8/2001 | Nishimoto .............. B29C 65/20 156/309.9 |
| 6,450,675 | B1 | * | 9/2002 | Nishimoto .............. B29C 65/20 362/546 |
| 6,872,770 | B2 | * | 3/2005 | Shah ...................... C08G 18/12 428/423.1 |
| 2012/0322945 | A1 | * | 12/2012 | Tomita ................. C08F 265/04 525/73 |
| 2013/0338311 | A1 | * | 12/2013 | Wakita ................ C08F 290/068 524/801 |

FOREIGN PATENT DOCUMENTS

| | | |
|---|---|---|
| JP | 2010-277892 A | 12/2010 |
| JP | 2011-84623 A | 4/2011 |
| JP | 2011-88997 A | 5/2011 |
| JP | 2011-104463 A | 6/2011 |
| JP | 2012-018887 A | 1/2012 |
| WO | 2010-138842 A1 | 12/2010 |

\* cited by examiner

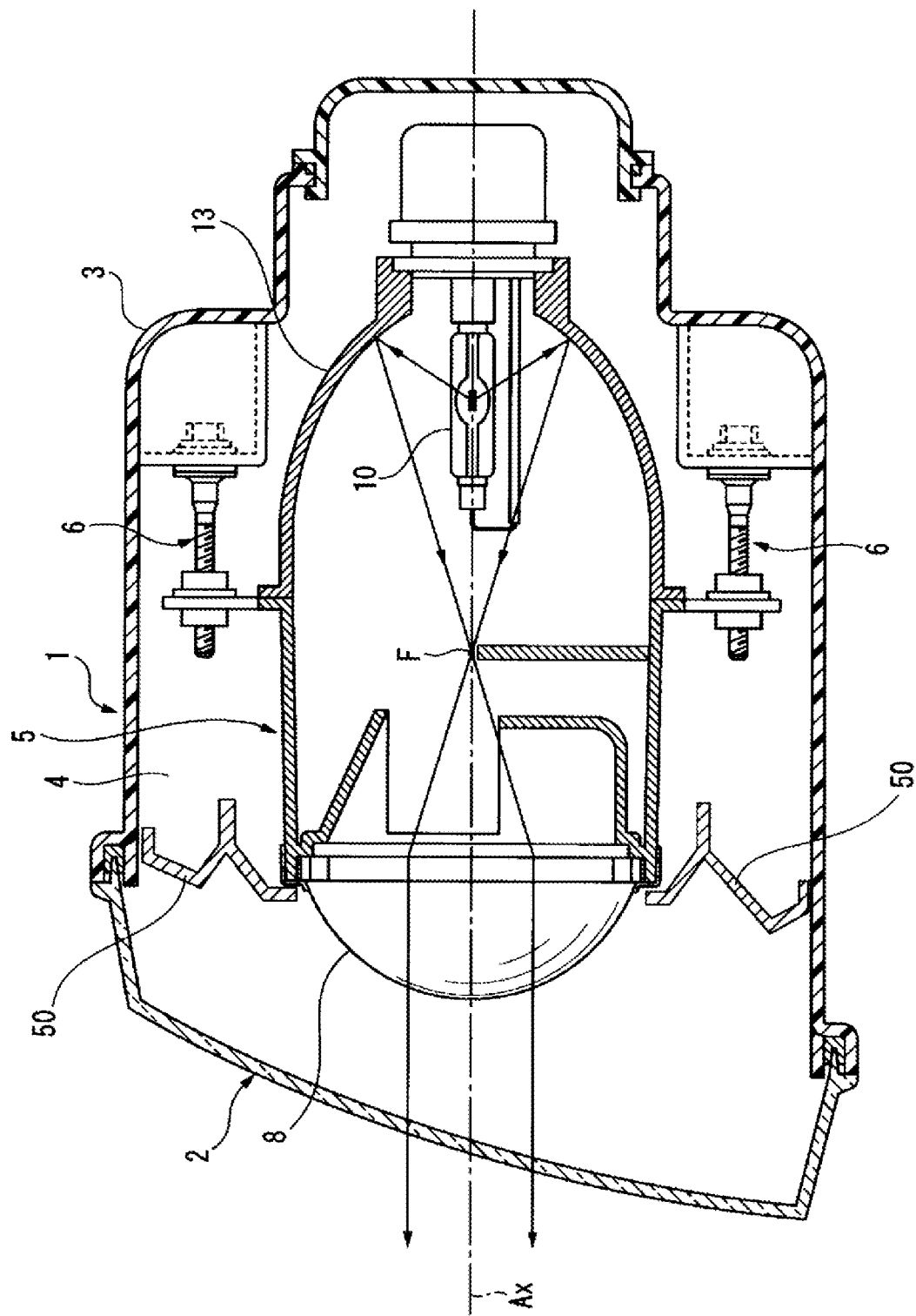

VEHICLE LAMP

CROSS REFERENCE TO RELATED APPLICATIONS

This application is a National Stage of International Application No. PCT/JP2013/052499 filed Feb. 4, 2013, based on Japanese Patent Application (Application No. 2012-28349) filed on Feb. 13, 2012, the content of which is incorporated herein by reference. In addition, all of the references cited herein are incorporated in their entireties by reference.

TECHNICAL FIELD

The present invention relates to a vehicle lamp, and particularly, a lightweight vehicle lamp having a high strength in which a lamp body and a front cover have good adhesiveness therebetween and there is no separation in a bonding part between the lamp body and the front cover even after some time.

BACKGROUND ART

In recent years, weight reduction of vehicles has been desired, and thus weight reduction of respective parts constituting vehicles has proceeded. A lamp (lamps) is also included as one of vehicle parts that are required to reduce the weights thereof.

In general, a vehicle lamp has a lamp body having a front opening, a front cover attached to block the front opening, an extension, a reflector, a light source, an electric component, and the like. The reduction of the weight of the lamp body which is generally made of a resin material and has a relatively high proportion of the total weight of the vehicle lamp is considered to be effective in reducing the total weight of the aforementioned vehicle lamp.

A resin molded product formed using a resin material is not sufficient in strength and the like if formed using the resin only. Thus, a filler is generally added to a base resin. Generally, a mineral material having a relatively high specific gravity such as talc is used as a filler suitable for a resin molded product requiring a mechanical strength and the like.

Therefore, in the case of a resin molded product formed using a resin material, in reducing the weight while maintaining the strength thereof, using a material having a lower specific gravity as a filler is considered to be effective.

PTL 1 discloses a technology for obtaining a molded product with a resin composition containing polypropylene and plant fibre.

Generally, a vehicle lamp having a lamp body having a front opening and a front cover attached to block the front opening uses a hotmelt adhesive for bonding between the front cover and the lamp body.

PRIOR ART DOCUMENT

Patent Document

Patent Document 1: JP-A-2011-88997

SUMMARY OF THE INVENTION

However, when a hotmelt adhesive is used for bonding between the front cover and the lamp body formed using a resin composition containing a base resin and plant fibre, the adhesiveness between the lamp body and the front cover is poor, and thus there is a problem that even if the parts become bonded, the bonding part becomes separated after some time.

In view of the aforementioned circumstances, the invention provides a vehicle lamp which uses a lamp body formed using a resin composition containing a base resin and plant fibre, and in which the lamp body and a front cover have good adhesiveness therebetween and there is no separation in the bonding between the lamp body and the front cover even after some time.

Means for Solving the Problem

The inventors of the invention have conducted intensive studies, and thus, they were able to solve the problems by employing the following configurations.

That is, the invention is as follows.

(1) A vehicle lamp including a lamp body having a front opening and a front cover which is attached to block the front opening, in which the lamp body is formed using a resin composition containing a base resin and plant fibre, and in a bonding part between the lamp body and the front cover, the bonding is performed using a moisture curing adhesive.

(2) The vehicle lamp according to (1), in which the moisture curing adhesive is at least any selected from silicone adhesives, modified silicone adhesives, urethane adhesives, cyano adhesives, and reactive hotmelt adhesives.

(3) The vehicle lamp according to (1) or (2), in which the base resin is at least any selected from polypropylene, polyethylene, polylactic acid, polycarbonate, polyethylene terephthalate, polybutylene terephthalate, polystyrene, acrylonitrile-butadiene-styrene copolymer, acrylonitrile-styrene-acrylate copolymer, acrylonitrile-ethylene-styrene copolymer, chlorinated polyethylene-acrylonitrile-styrene copolymer, polyamide, polyphenylene sulfide, liquid crystal polymer, polysulfone, epoxy resin, urethane resin, and silicone resin.

(4) The vehicle lamp according to any one of (1) to (3), in which the plant fibre is at least any selected from pulp, jute, Manila hemp, sisal hemp, ganpi, Mitsumata, paper mulberry, Japanese cedar, bamboo, cacao, kenaf, banana, pineapple, sugar cane, coconut palm, corn, bagasse, palm, reed, esparto, Sabaigurasu, hemp palm, Musa basjoo, pine, mulberry, agave, wheat, rice, and hinoki.

When a hotmelt adhesive is used for bonding between the front cover and the lamp body formed using a resin composition containing plant fibre, a cause of separation occurring in the bonding part after some time even when the bonding can be achieved is not clear, but the following reasons are considered.

The plant fibre easily contains water. When a product obtained by bonding the lamp body containing the water-containing plant fibre and the front cover using a hotmelt adhesive is used under normal use conditions (approximately 100° C., long time) as a vehicle lamp, it is considered that the water is released from the plant fibre contained in the vicinity of the bonding surface of the lamp body and enters a bonding interface, and thus separation is promoted. The reason for the promotion of the separation is presumed that the water entering the bonding interface is pushed against a curing surface of the adhesive, and thus holes which cause a deterioration in adhesiveness are caused in the adhesive curing surface. The holes can be confirmed through the front cover (PC).

However, in the invention, a moisture curing adhesive is used for bonding between the lamp body and the front cover. Therefore, even when water is released from the plant fibre contained in the vicinity of the bonding surface of the lamp body and enters the bonding interface, it is presumed that the water is absorbed by the moisture curing adhesive, and thus holes which cause a deterioration in adhesiveness are not caused in the curing surface of the adhesive.

In addition, it is presumed that in the bonding between the lamp body and the front cover, the water released from the plant fibre contained in the lamp body promotes the effects of the adhesive instead, and bonding workability between the lamp body and the front cover is improved. In addition, the adhesive absorbs the moisture in the lamp chamber, and thus it is presumed that fogging in the completed lamp can be reduced.

Advantage of the Invention

According to the invention, a moisture curing adhesive is used for bonding between a lamp body containing plant fibre and a front cover, and thus the lamp body and the front cover have good adhesiveness therebetween, whereby it is possible to prevent separation in the bonding part between the lamp body and the front cover even after some time.

BRIEF DESCRIPTION OF DRAWINGS

FIG. 1 is a schematic cross-sectional view showing an example of a vehicle lamp of the invention.

EXEMPLARY EMBODIMENTS

Hereinafter, preferred exemplary embodiments of a vehicle lamp of the invention will be described in detail.

An example of the vehicle lamp of the invention will be described using the schematic cross-sectional view of FIG. 1.

A vehicle lamp 1 of the invention has a transparent front cover 2 and a lamp body 3. In a lamp chamber 4 partitioned by the front cover 2 and the lamp body 3, a lamp unit 5 is supported by the lamp body 3 via an aiming mechanism 6. The lamp unit 5 shown in FIG. 1 is provided with a projection lens 8, a light source 10, and a reflector 13. An extension 50 is disposed to cover an inner surface of the lamp body 3 so that the projection lens 8 is exposed to the back side of the front cover 2.

The lamp body 3 used in the vehicle lamp of the invention (hereinafter, also referred to as "lamp body of the invention") will be described.

As described above, the lamp body 3 of the invention is shaped to have a front opening, and the front cover 2 is attached to the front opening.

In addition, the lamp body 3 of the invention is formed using a resin composition containing a base resin and plant fibre.

The plant fibre used in the resin composition which is used to mold the lamp body 3 of the invention is not particularly limited, and examples thereof include pulp, jute, Manila hemp, sisal hemp, ganpi, Mitsumata, paper mulberry, Japanese cedar, bamboo, cacao, kenaf, banana, pineapple, sugar cane, coconut palm, corn, bagasse, palm, reed, esparto, Sabaigurasu, hemp palm, Musa basjoo, pine, mulberry, agave, wheat, rice, and hinoki. Among these, pulp and jute are preferred.

The content of the plant fibre is not particularly limited, but can be appropriately selected according to the type of the used plant fibre, the type of the base resin to be described later which is used together, and the like. The content is preferably 5 mass % to 80 mass %, and more preferably 15 mass % to 60 mass % in the lamp body 3 of the invention.

The base resin used in the resin composition which is used to mold the lamp body 3 of the invention is not particularly limited, and examples thereof include polypropylene (PP), polyethylene (PE), polylactic acid (PLA), polycarbonate (PC), polyethylene terephthalate (PET), polybutylene terephthalate (PBT), polystyrene (PS), acrylonitrile-butadiene-styrene copolymer (ABS), acrylonitrile-styrene-acrylate copolymer (AAS), acrylonitrile-ethylene-styrene copolymer (AES), chlorinated polyethylene-acrylonitrile-styrene copolymer (ACS), polyamide (PA), polyphenylene sulfide (PPS), liquid crystal polymer (LCP), polysulfone (PSU), epoxy resin, urethane resin, and silicone resin. Among these, PP is preferred.

In the preparation of the resin composition which is used to mold the lamp body 3 of the invention, at least the base resin and plant fibre are kneaded to be uniform.

On this occasion, the kneading method is not particularly limited, and various kneading methods such as known screw kneading can be employed.

The front cover 2 and the lamp body 3 of the invention formed using the resin composition are bonded using a moisture curing adhesive. In this case, if necessary, an active treatment such as a plasma treatment and a UV treatment may be previously performed on the adhesion part.

The moisture curing adhesive used in the invention is promoted to be cured by water in the air, and is not particularly limited as long as it is such a material. Examples thereof include silicone adhesives, modified silicone adhesives, urethane adhesives, cyano adhesives, and reactive hotmelt adhesives.

The front cover 2 used in the invention is a transparent cover. Its material is not particularly limited as long as it is possible to block the front opening of the lamp body 3 and to form the lamp chamber, and a known material and the like can be used. Specific examples thereof include transparent thermoplastic resins such as polycarbonate, acrylic resin, and polystyrene, and inorganic transparent materials such as glass.

EXAMPLES

Hereinafter, results of an evaluation test using examples, comparative examples, and a reference example (conventional example) according to the invention will be shown to describe the invention in further detail. The invention is not limited to these examples.

Examples 1 to 3, Comparative Examples 1 to 3, and Conventional Example

Mixing of Base Resin and Plant Fibre and Pelletization

A polypropylene (PP) was used as a base resin, and plant fibre described in the following Table 1 was added thereto and kneaded so that the content thereof was as described in the following Table 1 with respect to the total amount of the base resin and the plant fibre.

After the kneading, pellets having an average diameter of 3 mm and an average length of 8 mm were produced using an extrusion kneader.

Preparation of Molded Product

The respective pellets were subjected to predrying for 4 hours at 90° C., and then put into an injection molding machine (manufactured by Toshiba Machine Co., Ltd, EC40N) to be injection-molded at a cylinder temperature of 190° C. and a mold temperature of 40° C. As a result, rectangular plate-like test pieces having a size of 110 mm×60 mm×3 mm were molded.

Adhesiveness Evaluation

An adhesion part of the molded plate-like test piece was previously subjected to an active treatment, and then it was stuck to a polycarbonate (PC) plate having the same size using an adhesive shown in the following Table 1. The adhesive was applied not to the entire surface, but only to a part of the sticking surface. The test pieces stuck using a urethane moisture curing adhesive were left for one week at room temperature, and the curing was completed.

Regarding each stuck sample, a wedge was driven into a gap (between the sample piece and the PC plate) separated at a distance from the adhesive-applied part, and the sample was exposed to each environment shown in the following Table 1 to evaluate whether it was possible to maintain the adhesiveness between the sample piece and the PC plate. The results thereof are shown in the following Table 1.

TABLE 1

|  | Plant Fibre | | | Long-Term Environment Test (30 days) | | |
| --- | --- | --- | --- | --- | --- | --- |
|  | Type | Content (mass %) | Adhesive | 100° C. | 50° C. 95RH % | Dipping in Warm Water of 40° C. |
| Conventional Example | — | — | Hotmelt | No Separation | No Separation | No Separation |
| Example 1 | Jute | 30 | Moisture Curing (urethane) | No Separation | No Separation | No Separation |
| Example 2 | Pulp | 20 | Moisture Curing (urethane) | No Separation | No Separation | No Separation |
| Example 3 | Japanese cedar | 25 | Moisture Curing (urethane) | No Separation | No Separation | No Separation |
| Comparative Example 1 | Jute | 30 | Hotmelt | Separation (after 4 hours) | No Separation | No Separation |
| Comparative Example 2 | Pulp | 20 | Hotmelt | Separation (after 4 hours) | No Separation | No Separation |
| Comparative Example 3 | Japanese cedar | 25 | Hotmelt | Separation (after 4 hours) | No Separation | No Separation |

When a hotmelt adhesive was used, it was possible to allow the PC plate to adhere to the PP plate containing no plant fibre in the conventional example. However, in the comparative examples, in the adhesion to the plant fibre-containing PP plate, separation occurred in all of the cases under an environment of 100° C. The reason for this is presumed that the water released from the plant fibre at high temperature enters an interface between the adhesive and the plant fibre-containing PP plate, and is pushed against the adhesive curing surface, and thus holes are caused in the adhesive curing surface.

In contrast, in the examples using a moisture curing adhesive, the water released from the plant fibre is absorbed by the adhesive, and thus separation does not occur even under a high temperature environment. In addition, due to the water supplied from the plant fibre, the curing of the adhesive more easily proceeds compared to the cases using the PP containing no plant fibre.

The invention has been described in detail with reference to the specific aspects, but it is obvious for those skilled in the art that various changes and modifications can be made as long as there is no departure from the spirit and scope of the invention.

INDUSTRIAL APPLICABILITY

A vehicle lamp of the invention uses a moisture curing adhesive for bonding between a lamp body containing plant fibre and a front cover. Therefore, the lamp body and the front cover have good adhesiveness therebetween, and thus it is possible to prevent separation in the bonding part between the lamp body and the front cover even after some time. As a result, the vehicle lamp of the invention is very effective as a vehicle lamp.

REFERENCE SIGNS LIST

1: VEHICLE LAMP
2: FRONT COVER
3: LAMP BODY
4: LAMP CHAMBER
5: LAMP UNIT
6: AIMING MECHANISM
8: PROJECTION LENS
10: LIGHT SOURCE
13: REFLECTOR
50: EXTENSION

The invention claimed is:
1. A vehicle lamp comprising:
a lamp body having a front opening; and
a front cover which is attached to block the front opening,
wherein the lamp body is formed using a resin composition containing a base resin and plant fibre, and
wherein in a bonding part between the lamp body and the front cover, the bonding is performed using a moisture curing adhesive.
2. The vehicle lamp according to claim 1,
wherein the moisture curing adhesive is at least any selected from silicone adhesives, modified silicone adhesives, urethane adhesives, cyano adhesives, and reactive hotmelt adhesives.
3. The vehicle lamp according to claim 1,
wherein the base resin is at least any selected from polypropylene, polyethylene, polylactic acid, polycarbonate, polyethylene terephthalate, polybutylene terephthalate, polystyrene, acrylonitrile-butadiene-styrene copolymer, acrylonitrile-styrene-acrylate copolymer, acrylonitrile-ethylene-styrene copolymer, chlorinated polyeth- ylene-acrylonitrile-styrene copolymer, polyamide, polyphenylene sulfide, liquid crystal polymer, polysulfone, epoxy resin, urethane resin, and silicone resin.

4. The vehicle lamp according to claim 1,
wherein the plant fibre is at least any selected from pulp, jute, Manila hemp, sisal hemp, ganpi, Mitsumata, paper mulberry, Japanese cedar, bamboo, cacao, kenaf, banana, pineapple, sugar cane, coconut palm, corn, bagasse, palm, reed, esparto, Sabaigurasu, hemp palm, Musa basjoo, pine, mulberry, agave, wheat, rice, and hinoki.

5. The vehicle lamp according to claim 2,
wherein the base resin is at least any selected from polypropylene, polyethylene, polylactic acid, polycarbonate, polyethylene terephthalate, polybutylene terephthalate, polystyrene, acrylonitrile-butadiene-styrene copolymer, acrylonitrile-styrene-acrylate copolymer, acrylonitrile-ethylene-styrene copolymer, chlorinated polyethylene-acrylonitrile-styrene copolymer, polyamide, polyphenylene sulfide, liquid crystal polymer, polysulfone, epoxy resin, urethane resin, and silicone resin.

6. The vehicle lamp according to claim 2,
wherein the plant fibre is at least any selected from pulp, jute, Manila hemp, sisal hemp, ganpi, Mitsumata, paper mulberry, Japanese cedar, bamboo, cacao, kenaf, banana, pineapple, sugar cane, coconut palm, corn, bagasse, palm, reed, esparto, Sabaigurasu, hemp palm, Musa basjoo, pine, mulberry, agave, wheat, rice, and hinoki.

7. The vehicle lamp according to claim 3,
wherein the plant fibre is at least any selected from pulp, jute, Manila hemp, sisal hemp, ganpi, Mitsumata, paper mulberry, Japanese cedar, bamboo, cacao, kenaf, banana, pineapple, sugar cane, coconut palm, corn, bagasse, palm, reed, esparto, Sabaigurasu, hemp palm, Musa basjoo, pine, mulberry, agave, wheat, rice, and hinoki.

8. The vehicle lamp according to claim 5,
wherein the plant fibre is at least any selected from pulp, jute, Manila hemp, sisal hemp, ganpi, Mitsumata, paper mulberry, Japanese cedar, bamboo, cacao, kenaf, banana, pineapple, sugar cane, coconut palm, corn, bagasse, palm, reed, esparto, Sabaigurasu, hemp palm, Musa basjoo, pine, mulberry, agave, wheat, rice, and hinoki.

\* \* \* \* \*